United States Patent Office 3,004,319
Patented Oct. 17, 1961

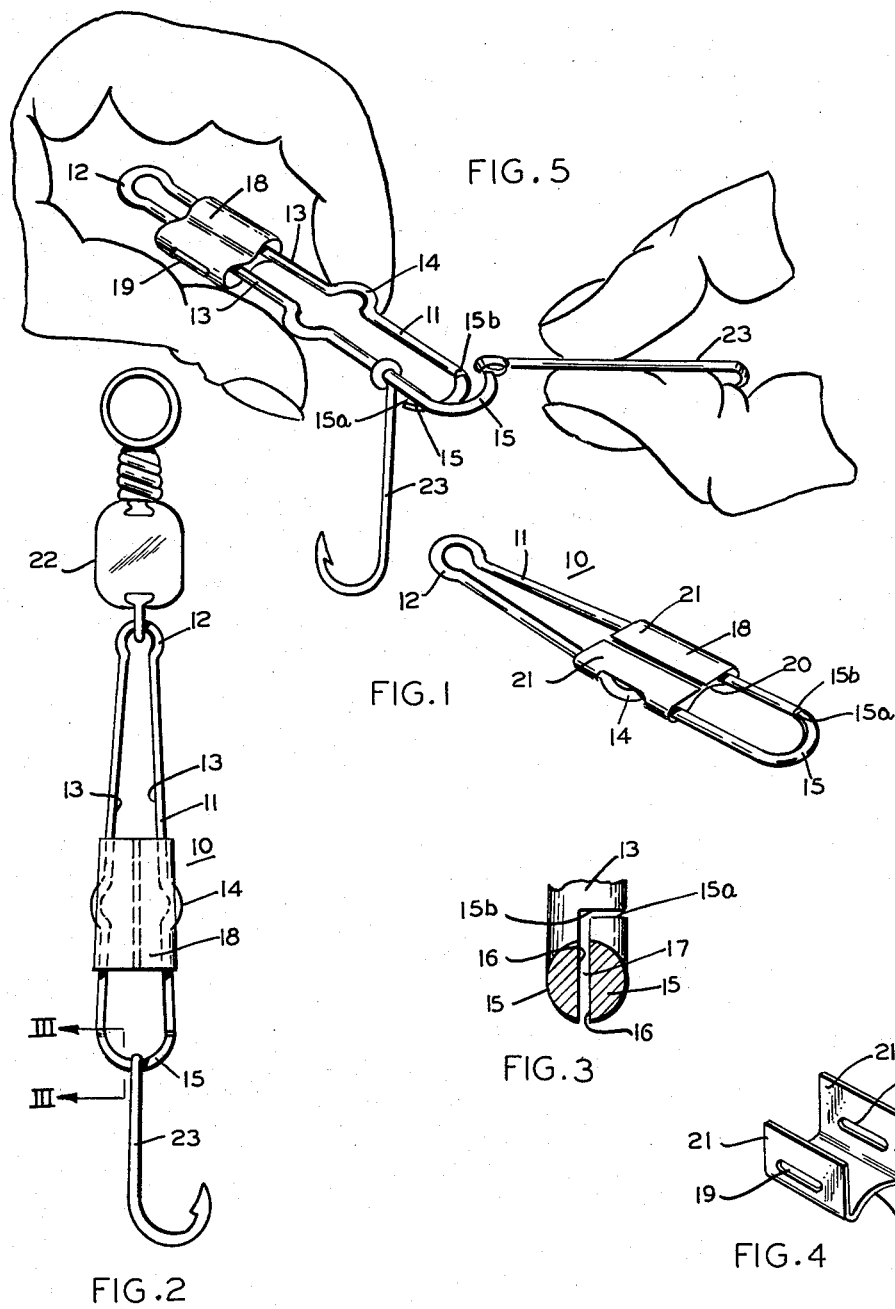

3,004,319
CLIP FOR FISH HOOKS AND THE LIKE
Charles Earl Hennon, 309 W. Hillcrest Ave.,
New Castle, Pa.
Filed June 8, 1959, Ser. No. 818,612
2 Claims. (Cl. 24—241)

This invention relates to an improved holder or clip device for releasably retaining fish hooks and the like, and more particularly to such a device having a sliding catch or locking member positioned remotely from latching end portions of the clip to hold the latching end portions in a closed position and lock the fish hooks and the like thereon.

Known types of hook retainers either operate similar to a safety pin or else have a sliding sleeve to enclose and latch the open ends of the retainer. To operate such a device, it is necessary to first disengage the latching or open end portions from the sleeve and then slide the sleeve away from the open end portions, in order that a fish hook or the like may be poistioned over a latching end. Other types of known retainers rely solely upon the resiliency of a large circular body portion in order to retain the latching ends together in a closed position. This resiliency does not provide a positive locking of the end portions and is easily and accidentally overcome resulting in the latching ends being inadvertently opened. Further, the elastic limit of the circular body is often exceeded during use, resulting in plastic deformation, and therefore it has been found that this type of retainer loses its resiliency and does not provide a sufficiently permanent type of locking-together of the latching ends.

It thus has been an object of my invention to provide an improved holder or clip which overcomes the disadvantages of known clips, and has an easily operable and positive locking mechanism to retain its latching end portions in a closed position;

A further object of my invention has been to provide an improved quickly and easily operable holder or clip having a sliding-catch member operatively positioned remotely from its latching end portions to lock the end portions in a closed position;

A further object of my invention has been to provide an improved clip for retaining fish hooks and the like having longitudinally-extending side portions resiliently urged-apart about a connecting eye end portion of small radius to thereby retain the resiliency within the extending side portions and inhibit surpassing the elastic limit thereof;

A further object of my invention has been to provide an improved quickly releasable and easily operable clip for fish hooks and the like having latching end portions which are locked in a closed position by means of a sliding catch operatively positioned in spatial relationship thereto;

These and further objects of my invention will become apparent to those skilled in the art from the following disclosure and accompanying drawings in which:

FIGURE 1 is a perspective view of my clip in a closed and latched position;

FIGURE 2 is a front elevational view showing latching end portions of the clip locked in a closed position by a sliding catch member which is snap-locked in position. In addition, the clip is shown connected to a swivel for ease in carrying, etc.;

FIGURE 3 is an enlarged cross sectional view taken along line III—III of FIGURE 2, showing overlapping and complementary spaced-apart latching end portions;

FIGURE 4 is a perspective view of a sliding catch or locking member in an open position, preparatory to being mounted on the clip; and, FIGURE 5 is a perspective view of my clip in an unlocked and open position showing the placing of fish hooks thereon.

Referring now to the drawings, and particularly FIGURES 1 and 2, the holder or clip 10 comprises a unitary or one-piece, flexible wire body portion 11 having an eye-shaped back end 12 that is formed continuous with longitudinally-extending and forwardly-diverging side portions 13, which are resiliently tensioned outwardly by an eye end portion 12. The eye 12 is formed with a small radius and the longitudinally-extending side portions 13 are connected at their backwardly converging portions thereto. Accordingly, the eye is not easily deformed above its elastic limit by the movement of the side portions 13 that may be flexed over a wide arcuate path and still retain their outwardly-tensioned resiliency.

Although the forwardly-extending diverging side portions 13 are substantially linear, they are each provided with opposed, outwardly-expanded, half-circle or rounded, snap or catch locking portions 14 intermediate their ends. The side portions 13 terminate forwardly in overlapping, rounded, hook-shaped latching end portions 15. The latching end portions are each flattened to a substantially semi-circular cross section, so that their combined thickness is substantially the same thickness as each side portion 13. Each semi-circular latching end portion 15 has a flattened surface 16 positioned adjacent to, but split or spaced-apart from the other. An opening or angular-shaped slit 17 is defined therebetween (note FIGURE 3). The semi-circular end portions 15 each has a shoulder portion or flat step 15b formed adjacent its respective leg portion, and a nose portion or flat end 15a that is adapted to rest adjacent the shoulder portion 15b of the opposite leg portion.

A sliding catch, sleeve or locking member 18 is slidably positioned over and around the side portions 13. The catch 18 is provided with open side portions or windows 19 that are adapted to receive the outwardly-expanded catch locking portions 14 to thereby retain the catch member in a snap-locked position and positively retain the latching end portions in a closed position. The catch 18 is provided with a re-entrant side 20 and overlapping flaps 21 which are bent inwardly between the side portions 13 to slidably retain it on the body portion 11 intermediate or centrally of and remote from its end portions 12 and 15. The clip 10 may be pivotally mounted on a swivel member 22, as shown in FIGURE 2, for ease in carrying and accessibility.

In operation, when the closed clip is to be opened, the outwardly-expanded catch locking portions 14 are squeezed inwardly and the sliding catch member 18 is slid backwardly along the convergence of side portions 13 (see FIGURE 5). The locking portions 14 are then manually pushed (compressed or flexed) inwardly to open the overlapping latching portions 15 and permit the placing of fish hooks, such as 23, or the like, on the clip. The locking portions 14 are then manually released, and the sliding catch 18 slid into locking engagement with the snap-locking portions 14 projecting through the open side portions 19 to retain the latching portions 15 in a closed, cooperating relationship. When in a closed relationship the overlapping latching portions 15 provide a smooth-ended clip, with the nose portions (pair) 15a tucked-in adjacent the opposite shoulder portions (pair) 15b.

It thus can be seen that the sliding catch 18 acts as a safety device to prevent the inadvertent opening of the latching end portions 15. In addition, since the sliding catch 18 is spaced-apart from the latching portions, it does not interfere with the accessibility thereto when applying a fish hook or the like to the clip. Further, since the diverging side portions 13 are substantially linear, the resiliency imparted thereto by the eye portion 12 of minimum radius will be retained during the squeezing or flexing movement thereof, and therefore the side portions 13 are not easily plastically deformed, as is the case in known non-linear types of retainers.

Although I have illustrated a single preferred embodiment of my invention, it is be understood that various changes and modifications may be made thereto without departing from the spirit and scope of the invention, as defined in the appended claims.

I claim:

1. An improved clip for removably retaining fish hooks and the like comprising, a one-piece flexible body member having an eye-shaped back end portion and a pair of forwardly-diverging side portions formed integral with said eye-shaped back end portion, said side portions being resiliently tensioned apart by said back end portion, said side portions terminating forwardly in a pair of overlapping latching portions, said overlapping latching portions having juxtapositioned flattened surfaces, catch means slidably positioned on said side portions for locking said latching portions in a closed position; and a pair of opposed inwardly-compressible and outwardly-offset locking means, forming a part of said diverging side portions, for engaging and retaining said catch means in a position which locks said latching portions in a closed position, and for releasing said catch means and opening said latching portions upon being compressed inwardly.

2. An improved clip-type holder for releasably-retaining a plurality of fish hooks and the like thereon which comprises, a unitary flexible wire body member, said body member having an eye-shaped backward end portion and a split forward end portion, said split forward end portion being formed by overlapping end portions of said wire body, each of said overlapping end portions being flattened to form a combined overlapping thickness substantially equal to the thickness of said wire body, said overlapping end portions being resiliently urged-apart by said eye-shaped backward end portion, slide means on said wire body operably positionable between said overlapping end portions and said eye-shaped backward end portion for retaining said overlapping end portions in a locked-closed position, said slide means having a pair of opposed latching windows formed therethrough, and said body member having a pair of integral outwardly-offset opposed locking portions intermediate its ends which are positionable within said latching windows to retain said slide means in its operable position and which are inwardly-compressible to release said slide means and open said overlapping end portions.

References Cited in the file of this patent

UNITED STATES PATENTS

| | | |
|---|---|---|
| 122,192 | Pond | Dec. 26, 1871 |
| 444,717 | Stout | Jan. 13, 1891 |
| 718,794 | Reimard | Jan. 20, 1903 |
| 1,094,568 | Hornich | Apr. 28, 1914 |
| 1,515,849 | Eppinger | Nov. 18, 1924 |
| 1,647,140 | Ludy | Nov. 1, 1927 |
| 2,840,898 | Yoe | July 1, 1958 |